(12) United States Patent
Alazet

(10) Patent No.: US 6,923,110 B2
(45) Date of Patent: Aug. 2, 2005

(54) VERTICAL-PIT BARBECUE USING CHARCOAL, LAVA ROCK, WOOD, GAS AND OTHER FUELS

(76) Inventor: Jean Alazet, 26, Rue des Fosses, Saint Bernard, Paris (FR), F-75005

( * ) Notice: Subject to any disclaimer, the term of this patent is extended or adjusted under 35 U.S.C. 154(b) by 0 days.

(21) Appl. No.: 10/492,422

(22) PCT Filed: Oct. 2, 2002

(86) PCT No.: PCT/FR02/03353

§ 371 (c)(1),
(2), (4) Date: Apr. 12, 2004

(87) PCT Pub. No.: WO03/041547

PCT Pub. Date: May 22, 2003

(65) Prior Publication Data

US 2004/0250693 A1 Dec. 16, 2004

(30) Foreign Application Priority Data

Oct. 10, 2001 (FR) .............................. 01 13032

(51) Int. Cl.⁷ .............................. A23L 1/00; A47J 37/00; A47J 37/07
(52) U.S. Cl. .............................. 99/340; 99/375; 99/389; 99/393; 99/401; 99/421 H; 99/446; 99/450; 126/25 R; 126/9 R
(58) Field of Search .................. 99/340, 339, 372–375, 99/385, 389, 393, 400, 401, 419–421 V, 444–450, 481, 482; 126/25 R, 25 A, 9 R, 41 R; 426/523

(56) References Cited

U.S. PATENT DOCUMENTS

| 1,836,894 A | 12/1931 | Bedigian |
| 2,828,733 A | 4/1958 | Moore, Jr. |
| 3,683,791 A | * 8/1972 | Rast, Jr. ...................... 99/340 |
| 3,742,838 A | * 7/1973 | Luschen et al. .............. 99/389 |
| 4,089,258 A | * 5/1978 | Berger .......................... 99/339 |
| 4,120,237 A | * 10/1978 | Mecherlen .................... 99/340 |
| 4,338,912 A | * 7/1982 | Gaskins .................... 126/25 A |
| 4,619,190 A | * 10/1986 | Smith .......................... 99/393 |
| 4,627,410 A | * 12/1986 | Jung ........................ 126/25 A |
| 5,536,518 A | * 7/1996 | Rummel ..................... 426/523 |
| 5,918,536 A | * 7/1999 | Cheng .......................... 99/447 |
| 6,742,445 B2 | * 6/2004 | Backus et al. ............ 99/421 H |

FOREIGN PATENT DOCUMENTS

| DE | 18 03 466 | 5/1970 |
| DE | 31 38 171 | 4/1983 |

* cited by examiner

Primary Examiner—Timothy F. Simone
(74) Attorney, Agent, or Firm—Young & Thompson

(57) ABSTRACT

The invention concerns a vertical-pit barbecue using charcoal, wood or lava rocks. The invention concerns a box-shaped barbecue (1) accessible from the top. One or both opposite side(s) of the box is/are cut out in the horizontal direction (13) and is/are equipped with fins (3) sloping somewhat downwards. The cooking racks (5), spits and fat collecting receptacles (10) are supported by arms (8), stands (9) and stems (7) foldable on either side of the box (1). The inventive barbecue is used for vertical cooking.

2 Claims, 2 Drawing Sheets

VERTICAL-PIT BARBECUE USING CHARCOAL, LAVA ROCK, WOOD, GAS AND OTHER FUELS

The present invention relates to a barbecue with a vertical firebox for wood charcoal, or wood or volcanic stones.

There exist barbecues with a horizontal firebox which have the drawback of carbonizing the meat because of the flow of hot grease onto the embers of the firebox and producing substantial smoke.

There generally exist barbecues with a vertical firebox which avoid the drawbacks described above, but which have other drawbacks, in particular the packing down of the embers which does not permit homogeneous cooking of the foodstuffs.

Also, the falling of burning embers during cooking can give rise to burns and also difficulties of filling the fuel into the firebox.

The device according to the invention permits overcoming the above drawbacks.

The barbecue according to a first characteristic is constituted by a rectangular box whose upper portion is provided with a hatch with two swinging doors opening outwardly about a horizontal axis forming a funnel in the open position to facilitate filling fuel or volcanic stones into the firebox.

One or both opposite side surfaces of the box are cut out in a horizontal direction and provided with fins fixed inwardly of the box with a certain inclination toward the bottom of the box, preventing the fuel or volcanic stones to fall outwardly. These fins channel the heat from the bottom to the top outwardly and above all permit supporting the embers of the firebox, thereby avoiding rapid packing down of the burning material in the case of wood charcoal or wood and thereby rendering the cooking of the foodstuffs homogeneous.

Thus, according to a second characteristic, the supporting fins can be movably actuated about a horizontal axis. According to a third characteristic, the firebox can be provided with electrical resistances for gas burning, permitting also heating the volcanic stones.

The box has arms, supports and brackets foldable against the side surfaces about a vertical axis located on the edges of the box, these arms, supports and brackets, are adapted to carry in the case of the arms the grease collectors and to stabilize the assembly as to the supports to carry the cooking grills vertically, and for the brackets to carry cooking spits.

Located in the lower portion of the box, there is provided a grill drawer supporting the embers and an ashes drawer for recovering the ashes as is conventional.

Figure 1:
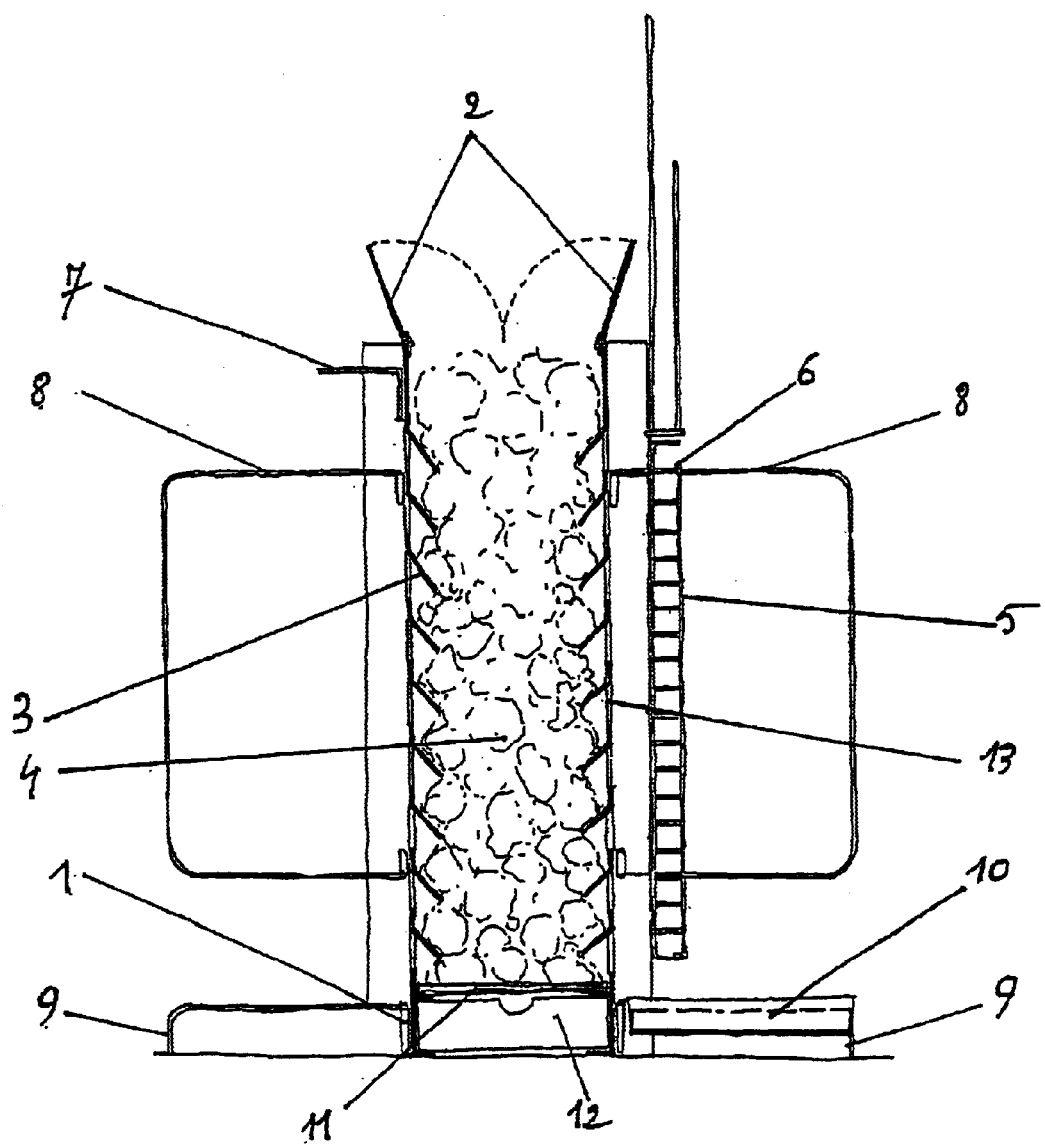
Figure 3:
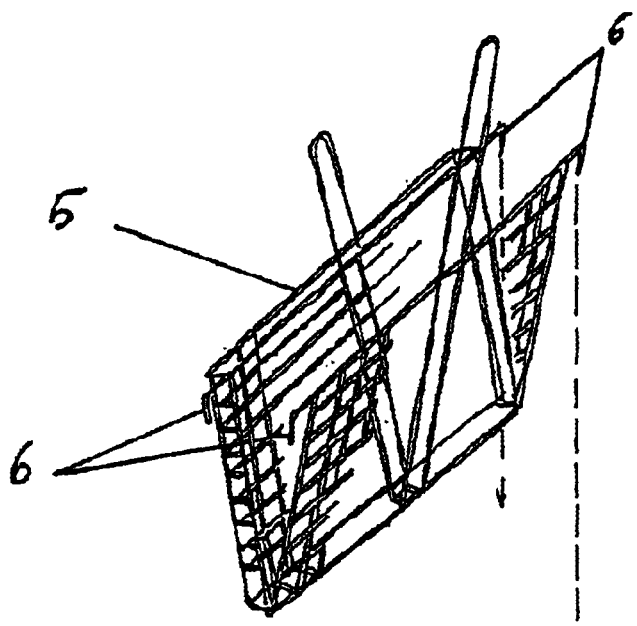
Figure 2:
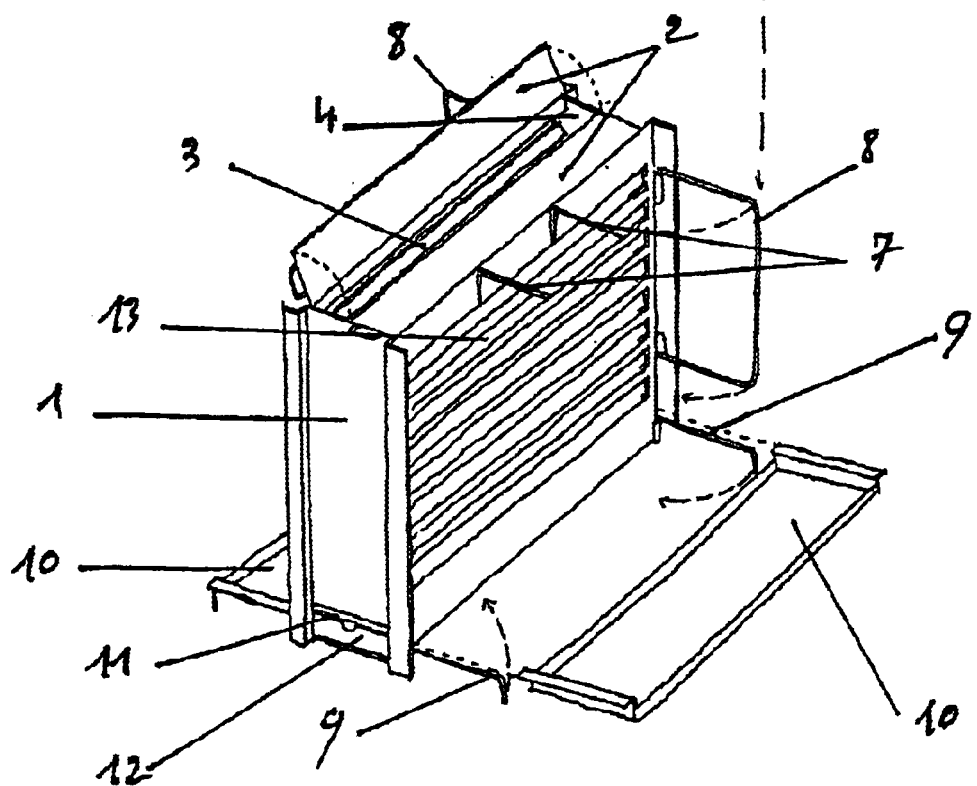

The accompanying drawings illustrate the invention:
FIG. 1 shows a cross-section of the barbecue.
FIG. 2 shows a perspective of the barbecue.
FIG. 3 shows a cooking grill with its hanging means.

With reference to the drawings, the barbecue comprises a rectangular box (1) whose upper portion is provided with a hatch with two swinging doors (2) opening outwardly about a horizontal axis forming a funnel in the open position.

One or both of the opposite side surfaces of the box (1) is cut out in the horizontal direction (13) and provided with fixed fins (3) directed inwardly of the box (1) with a certain downward inclination so as to permit the latter to support the embers of the firebox (4), to channel the heat upwardly outwardly adjacent the cooking grills (5) with its finger means (6) and brackets (7).

These fins (3) prevent the fuel (4) from falling outwardly, either during cooking or during filling with fuel.

The firebox (1) can be provided with electric resistances or those of burners or gas (not shown on the drawings) permitting heating the volcanic stones (4).

The support fins (3) can be movably adjusted about their horizontal axis by actuating means.

The box (1) comprises foldable arms (8) carrying the cooking grills (5) with their hanger means (6), supports (9) serving as stabilizers for the assembly and supports for the grease collectors (10) and the brackets (7) permitting suspending the cooking spits.

The arms (8), supports (9) and brackets (7) are foldable about a vertical axis against the lateral surfaces of the box (1).

By way of example, located in the lower portion of the box (1) there is provided a grill drawer (11) supporting the firebox (4) and an ashes drawer (12) for recovering ashes.

The barbecue according to the invention is particularly adapted to carrying out grilling without risk, homogeneously and without flaming, providing two cooking surfaces for the same quantity of fuel, and hence economically.

What is claimed is:

1. Barbecue with a vertical firebox for wood charcoal, wood or volcanic stones, in the form of a box, characterized in that the firebox (4) is constituted by a box (1) whose upper portion is provided with an access hatch (2) with two swinging doors opening outwardly about a horizontal axis forming a funnel in the open position;

one or both of the opposite side surfaces of the box (1) being cut out in the horizontal direction (13) and being provided with fixed fins (3) inwardly of the box (1) with a certain downward inclination permitting supporting the fuel or the volcanic stones (4) and to channel the heat toward the foodstuff to be cooked;

arms (8), supports (9) and brackets (7) are foldable against the side surfaces of the box about a vertical axis.

2. Barbecue according to claim 1 characterized in that the arms (8), supports (9) and brackets (7) are provided on opposite sides of the box (1) and serve to carry cooking grills (9) with their hanger means (6) for grease collectors (10).

* * * * *